United States Patent
Wang et al.

(10) Patent No.: US 12,438,969 B2
(45) Date of Patent: Oct. 7, 2025

(54) CAMERA DECORATION PART, FABRICATION METHOD, AND ELECTRONIC DEVICE

(71) Applicant: Honor Device Co., Ltd., Shenzhen (CN)

(72) Inventors: Qi Wang, Shenzhen (CN); Jiajing Zhang, Shenzhen (CN); Zhen Wang, Shenzhen (CN); Baojun Gao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 23 days.

(21) Appl. No.: 17/799,379

(22) PCT Filed: Apr. 26, 2022

(86) PCT No.: PCT/CN2022/089285
§ 371 (c)(1),
(2) Date: Aug. 12, 2022

(87) PCT Pub. No.: WO2022/262431
PCT Pub. Date: Dec. 22, 2022

(65) Prior Publication Data
US 2024/0187507 A1    Jun. 6, 2024

(30) Foreign Application Priority Data

Jun. 15, 2021 (CN) .......................... 202110660324.8

(51) Int. Cl.
*H04N 23/51* (2023.01)
*H04M 1/02* (2006.01)
*H04N 23/57* (2023.01)

(52) U.S. Cl.
CPC .......... *H04M 1/0264* (2013.01); *H04N 23/51* (2023.01)

(58) Field of Classification Search
CPC ...... H04N 23/57; H04N 23/51; H04M 1/0264
See application file for complete search history.

(56) References Cited

U.S. PATENT DOCUMENTS

| 9,554,041 B1 | 1/2017 | Shin et al. |
| 2006/0238532 A1 | 10/2006 | LaFleur |

(Continued)

FOREIGN PATENT DOCUMENTS

| CN | 107396573 A | * 11/2017 | .......... H04M 1/0264 |
| CN | 206790536 U | 12/2017 | |

(Continued)

OTHER PUBLICATIONS

Liu, J., et al., "To Explore the Design Style of Communications Products from Korea" from Development & Innovation of Machinery & Electrical Products; Nov. 28, 2006, 6 pages, with English Translation.

*Primary Examiner* — Charles N Appiah
*Assistant Examiner* — Farideh Madani
(74) *Attorney, Agent, or Firm* — Conley Rose, P.C.

(57) ABSTRACT

A camera decoration part, fabrication method, and electronic device. The camera decoration part includes a first plate and a second plate; a first surface of the first plate has a decoration rendering; a second through-hole corresponding to a first through-hole is disposed on the second plate; a first surface of the second plate includes a connection area and an avoidance area, where the avoidance area is formed by recessing the first surface of the second plate to a second surface of the second plate by a first depth, a thickness of the second plate is greater than or equal to a height of a protrusion on a housing of the electronic device, the first depth is greater than or equal to the height of the protrusion, and a projection of the protrusion is in a projection area of the avoidance area.

17 Claims, 12 Drawing Sheets

(56) References Cited

U.S. PATENT DOCUMENTS

2019/0387139 A1* 12/2019 Zhang .................... H04N 23/55
2020/0412920 A1* 12/2020 Yao ....................... H04N 23/57
2022/0294949 A1    9/2022 Li et al.

FOREIGN PATENT DOCUMENTS

| CN | 208956093 U  |   | 6/2019  |
|----|--------------|---|---------|
| CN | 110149469 A  |   | 8/2019  |
| CN | 110417965 A  |   | 11/2019 |
| CN | 210491009 U  |   | 5/2020  |
| CN | 112449084 A  |   | 3/2021  |
| CN | 212696068 U  | * | 3/2021  |
| CN | 112671964 A  |   | 4/2021  |
| CN | 112738305 A  |   | 4/2021  |
| CN | 213186172 U  |   | 5/2021  |
| CN | 113542553 A  |   | 10/2021 |
| WO | 2014136861 A1|   | 9/2014  |

* cited by examiner

CAMERA DECORATION PART, FABRICATION METHOD, AND ELECTRONIC DEVICE

CROSS-REFERENCE TO RELATED APPLICATIONS

This application is a U.S. National Stage of International Application No. PCT/CN2022/089285 filed on Apr. 26, 2022, which claims priority to Chinese Patent Application No. 202110660324.8, filed with the China National Intellectual Property Administration on Jun. 15, 2021, both of which are incorporated herein by reference in their entireties.

TECHNICAL FIELD

This application relates to the field of electronic device technologies, and in particular, to a camera decoration part, a fabrication method, and an electronic device.

BACKGROUND

A camera decoration part is a component used to decorate a camera of an electronic device. As shown in FIG. 1A, in an implementation, a decoration rendering of the camera decoration part is usually prepared on a surface of a single transparent plate first, for example, a texture effect, and a glare effect. Then, the single plate with the decoration rendering is integrally mounted on a housing 01 of an electronic device. The surface prepared with the decoration rendering is used as a mounting surface and is mounted to face the housing 01 of the electronic device, so that the camera decoration part 02 with a complete decoration rendering (a decoration effect is not shown in figures) and good transparency may be obtained.

However, as a size of the camera of the electronic device increases, a thickness of the camera mounted on the electronic device is much greater than a thickness of the electronic device body. Therefore, to protect the camera protruding from the electronic device body, a protection structure may be disposed around the camera to protect the camera. The protection structure cooperating with the protrusive camera protrudes from an outer surface of the housing of the electronic device by a certain height.

When the camera decoration part is connected to the housing of the electronic device, due to existence of the protection structure, to connect the camera decoration part and the housing of the electronic device, avoidance cutting may be performed on a part of the mounting surface that is of the single plate and that corresponds to the protection structure needs to be performed. However, the avoidance cutting operation on the mounting surface of the single plate will inevitably cut off a part of the decoration rendering on the mounting surface of the original single flat plate, thereby affecting an overall effect of the camera decoration part.

SUMMARY

This application provides a camera decoration part, a fabrication method, and an electronic device, to provide a flat mounting surface for a first plate, so as to ensure completeness of a decoration rendering on a first surface of the first plate.

According to a first aspect, this application provides a camera decoration part, applied to an electronic device, where the electronic device includes a camera assembly, the camera assembly includes a main camera protruding from an outer surface of a housing of the electronic device by a first height and a protrusion that is located around the main camera and that is connected to the outer surface of the housing of the electronic device;

the camera decoration part includes a first plate and a second plate; a first surface of the first plate is connected to a second surface of the second plate, and a first surface of the second plate is connected to the outer surface of the housing of the electronic device; a first through-hole used to penetrate through the main camera is disposed on the first plate, and a second through-hole corresponding to the first through-hole is disposed on the second plate; the first surface of the first plate has a decoration rendering, and a material of the first plate is a transparent material; and the first surface of the second plate includes a connection area and an avoidance area, and the avoidance area is formed by recessing the first surface of the second plate to the second surface of the second plate by a first depth, where a thickness of the second plate is greater than or equal to a height of the protrusion on the housing of the electronic device, the first depth is greater than or equal to the height of the protrusion, and a projection of the protrusion is in a projection area of the avoidance area.

In this way, the connection area of the second plate is correspondingly connected to the housing of the electronic device. The avoidance area is mounted in cooperation with the protrusion, and the height of the protrusion is less than or equal to the first depth. Therefore, after the second plate is connected to the housing, the second surface of the second plate and an upper surface of the protrusion are on a same horizontal plane, or a horizontal plane on which the second surface of the second plate is located is higher than a horizontal plane on which the upper surface of the protrusion is located, so that a flat mounting surface can be provided for the first plate, and completeness of the decoration rendering on the first surface of the first plate is ensured.

In an implementation, the first depth is equal to the thickness of the second plate, the second through-hole communicates with the avoidance area to form a hollow-out area, and the connection area surrounds the hollow-out area.

In this way, when the second plate is connected to the housing, the main camera and the protrusion can be avoided through the hollow-out area. The first surface of the first plate connected to the second plate may avoid the protrusion and be connected to the connection area of the second plate, so that the completeness of the decoration rendering on the first surface of the first plate is ensured.

In an implementation, a third plate is disposed between the first plate and the second plate, and a decoration ring corresponding to the first through-hole is disposed on the third plate.

In this way, the third plate added between the first plate and the second plate may reduce a thickness of the first plate, so that the first plate has better transparency.

In an implementation, a first limiting baffle plate is further included. The first limiting baffle plate extends along a periphery of the third plate in a direction that is close to the first plate, and the first plate is surrounded in an area that is enclosed by the first limiting baffle plate.

In this way, the first plate may be limited in the area enclosed by the first limiting baffle plate on the third plate by using the first limiting baffle plate, so as to ensure assembly accuracy.

In an implementation, a second limiting baffle plate is further included. The second limiting baffle plate extends along an inner hole wall of the decoration ring in a direction that is close to the second plate, and the second limiting baffle plate is configured to limit the decoration ring around the main camera. A third limiting baffle plate is disposed around the decoration ring. The third baffle plate is located on a second surface of the third plate, and the third baffle plate is configured to limit a lens corresponding to the main camera A groove is enclosed by the third limiting baffle plate and the first limiting baffle plate, and the first plate is located in the groove.

In this way, after the decoration ring is placed around the main camera, the second limiting baffle plate can just fit into a camera hole of the main camera, thereby limiting the decoration ring around the main camera, and preventing the decoration ring from moving.

In an implementation, the decoration rendering is printed on the first surface of the first plate through a printing process.

In this way, the decoration rendering may be directly fabricated on the first surface of the first plate. For example, first, a desired texture may be fabricated on the first surface of the first plate through a UV transfer printing process; then a film is coated on the first surface of the first plate, so as to obtain a desired glare effect; and finally, ink may also be coated on the first surface of the first plate, where the ink can protect the texture and strengthen adhesive performance between the first plate and the second plate.

In an implementation, the decoration rendering is formed by pasting a film with the decoration rendering on the first surface of the first plate.

In this way, a problem that an inner wall of the first through-hole of the first plate is easily contaminated during the process of directly fabricating the decoration rendering on the first surface of the first plate can be avoided.

In an implementation, the first surface of the first plate includes at least one window area.

Therefore, an AR film may be coated on the first surface of the first plate or a selected area of a film, to obtain a window area with high transparency. The window area may be used as a lens for a small camera in the camera assembly.

In an implementation, the second surface of the second plate is pasted and connected to the first surface of the first plate by using a hot melt adhesive tape.

In an implementation, the second surface of the second plate is pasted and connected to the first surface of the first plate by using the following method:
  pre-bonding the second surface of the second plate to the hot melt adhesive tape under a silicone roller with a first temperature;
  bonding and placing the first surface of the first plate and the second surface of the second plate on a hydraulic press for press fitting, to obtain an assembly of the first plate 1 and the second plate;
  placing the assembly obtained after press fitting on a roller machine for repeated rolling; and
  placing the assembly rolled by the roller machine in a defoaming machine for bake-out, to obtain the camera decoration part.

In this way, connection strength between the first plate and the second plate can be ensured; in addition, the hot melt adhesive tape is only about 0.05 mm, which can ensure that the entire camera decoration part has very good transparency.

In an implementation, the first temperature is 120-140° C.

In an implementation, a press fitting temperature of the hydraulic press is 110-130° C., and a press fitting time is 5-20 seconds.

In an implementation, a rolling speed of the roller machine is 2-10 m/min, and a rolling temperature of the roller machine is 80-100° C.

In an implementation, a bake-out temperature in the defoaming machine is 80-100° C., and a bake-out time is 20-40 minutes.

In an implementation, a glue dispensing groove is disposed on the second surface of the second plate, and a retaining wall is disposed around a periphery of the glue dispensing groove; and the second surface of the second plate is pasted and connected to the first surface of the first plate by using glue, and the glue is filled in the glue dispensing groove.

In this way, after the glue is solidified, the glue is located between the first plate and the second plate, and the retaining wall acts as a concealer, so that an appearance of the camera decoration part has no residual glue and other defects, and the entire camera decoration part has good transparency.

In an implementation, the first plate is pasted and connected to the third plate by using an adhesive tape, and the second plate is pasted and connected to the third plate by using a hot melt adhesive tape.

In this way, a connection gap between the second plate and the third plate and a connection gap between the first plate and the third plate may be reduced, so that the entire camera decoration part has a compact structure.

According to a second aspect, this application provides an electronic device, including a main camera and the camera decoration part according to any one of the first aspect, where the camera decoration part is mounted around the main camera.

In this way, a connection area of a second plate is correspondingly connected to a housing of the electronic device, and an avoidance area is mounted in cooperation with a protrusion. A height of the protrusion is less than or equal to a first depth. Therefore, after the second plate is connected to the housing, a second surface of the second plate and an upper surface of the protrusion are on a same horizontal plane, or a horizontal plane on which the second surface of the second plate is located is higher than a horizontal plane on which the upper surface of the protrusion is located, so that a flat mounting surface can be provided for a first plate, and completeness of a decoration rendering on a first surface of the first plate is ensured, thereby improving product competitiveness of the electronic device.

According to a third aspect, this application further provides a method for fabricating a camera decoration part, where the camera decoration part includes a first plate and a second plate;
  pre-bonding the second surface of the second plate to the hot melt adhesive tape under a silicone roller with a first temperature;
  bonding and placing the first surface of the first plate and the second surface of the second plate on a hydraulic press for press fitting, to obtain an assembly of the first plate 1 and the second plate;
  placing the assembly obtained after press fitting on a roller machine for repeated rolling; and
  placing the assembly rolled by the roller machine in a defoaming machine for bake-out, to obtain the camera decoration part.

In this way, the camera decoration part fabricated by using the foregoing method can improve adhesive strength between the first plate and the second plate, and can also ensure that a connection surface between the first plate and the second plate is flat and flawless.

In an implementation, the first temperature is 120-140° C.

In an implementation, a press fitting temperature of the hydraulic press is 110-130° C., and a press fitting time is 5-20 seconds.

In an implementation, a rolling speed of the roller machine is 2-10 m/min, and a rolling temperature of the roller machine is 80-100° C.

In an implementation, a bake-out temperature in the defoaming machine is 80-100° C., and a bake-out time is 20-40 minutes.

DESCRIPTION OF EMBODIMENTS

An electronic device in this application may be any electronic device with a camera, for example, a mobile phone, a smartwatch, or a computer. In the following embodiments of this application, a mobile phone is used as an example to illustrate a structure of a camera decoration part on the electronic device.

To avoid cutting off a part of a decoration rendering on a mounting surface of a single flat plate, an embodiment of this application provides a camera decoration part.

Embodiment 1

Figure 1A:
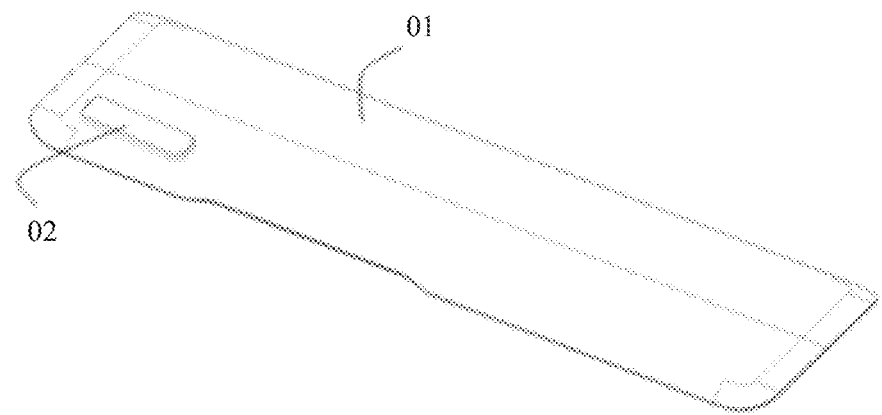
FIG. 1A is a schematic diagram of a structure of a housing of an electronic device equipped with a camera decoration part.
Figure 2A:
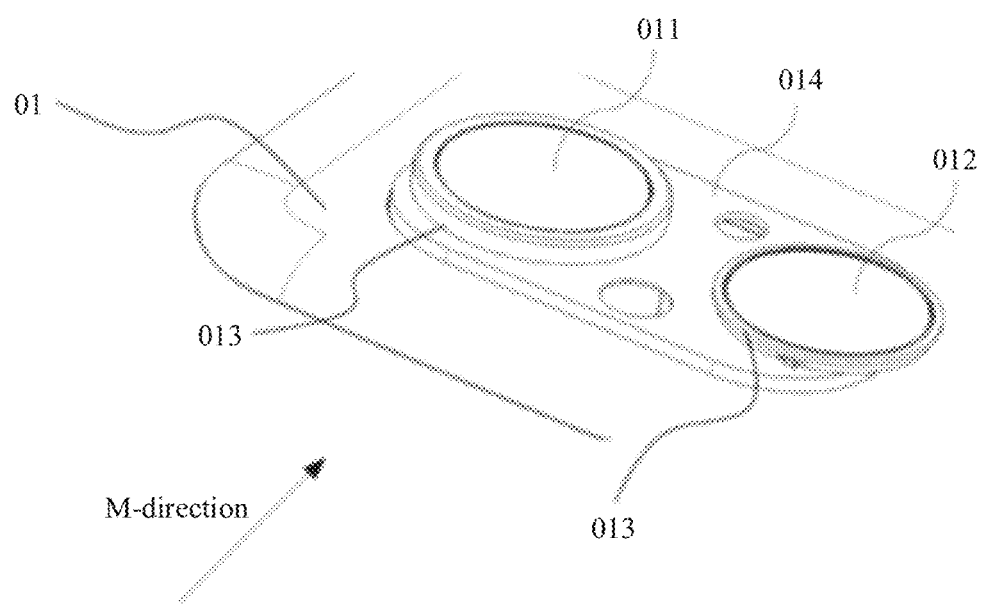
FIG. 2A is a schematic diagram of a structure of an electronic device after a camera decoration part is removed according to an embodiment of this application.
Figure 2B:
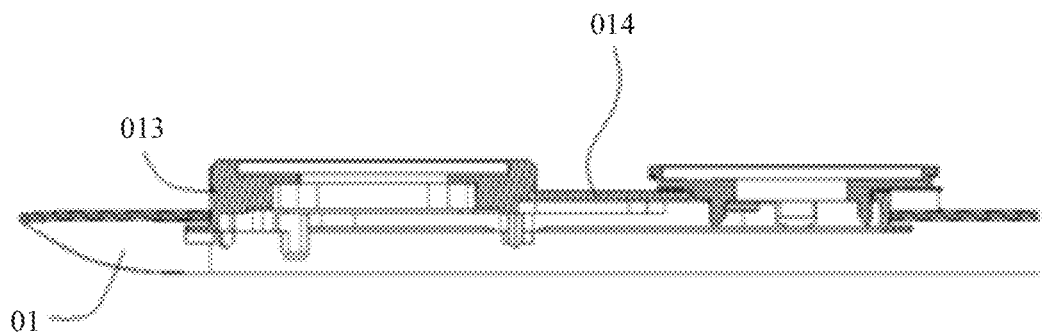
FIG. 2B is a schematic diagram of an M-direction structure of FIG. 2A.

First, refer to FIG. 2A and FIG. 2B. FIG. 2A shows a structure of a camera assembly on a housing of an electronic device according to an implementation. The camera assembly includes four cameras. A first camera 011 and a second camera 012 among the four cameras are main cameras, and the remaining two smaller cameras are non-main cameras. The main cameras may extend much out of the electronic device body in a thickness direction. To protect the main cameras, a metal ring 013 and a protrusion 014 cooperating with the metal ring 013 are sleeved around each main camera. The protrusion 014 is configured to hold the metal ring 013 and the housing 01, so that the metal ring 013 is supported and fastened to the housing 01. FIG. 2B is a schematic diagram of an M-direction structure of FIG. 2A. It can be clearly learned from FIG. 2B that the protrusion 014 located between the two metal rings 013 is higher than the housing 01 by a certain height.

Figure 2C:
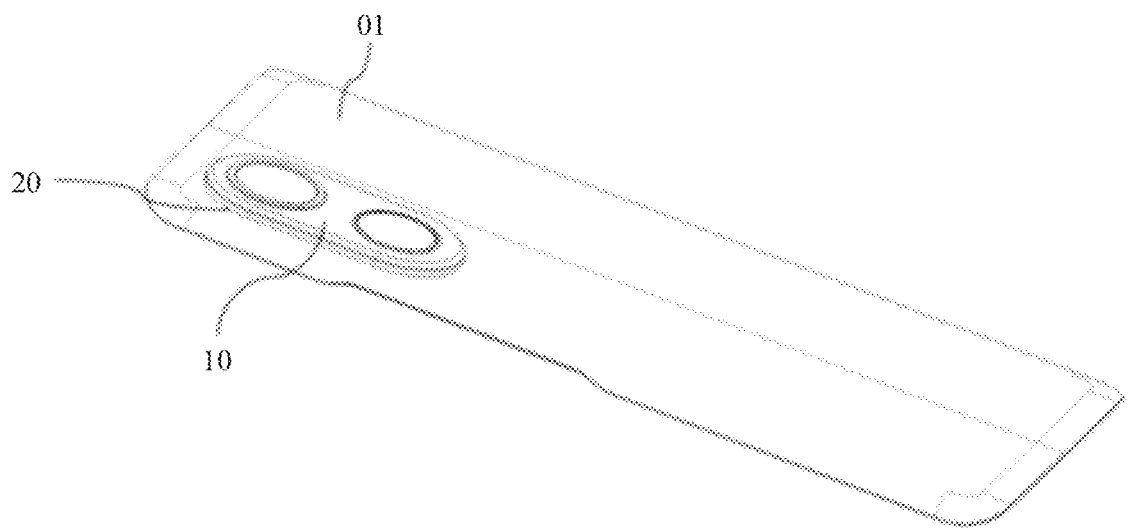
FIG. 2C shows an overall rendering after a camera decoration part provided in this application is mounted, in cooperation with the camera assembly in FIG. 2A, on a housing of an electronic device.
Figure 2D:
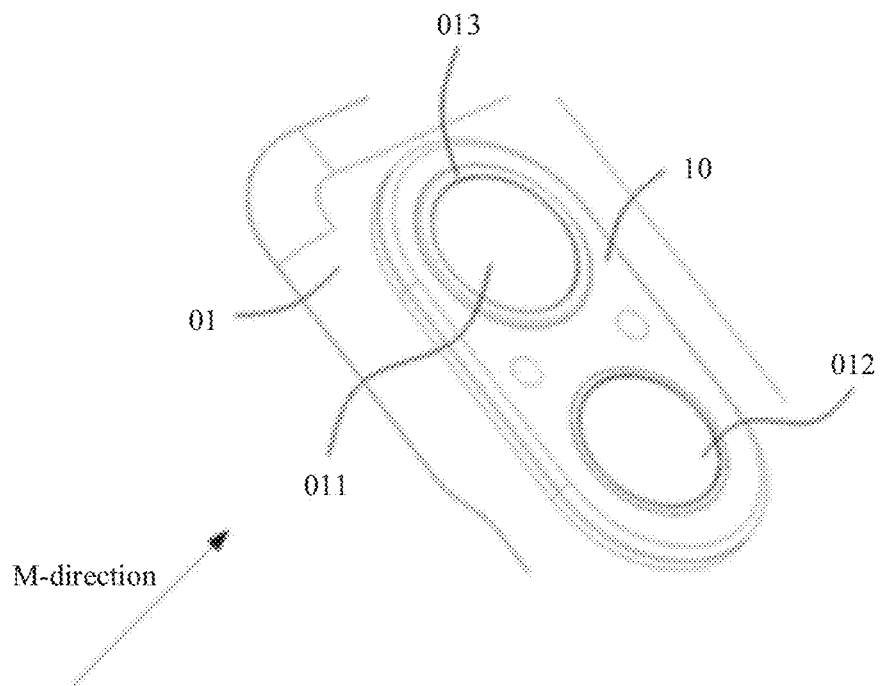
FIG. 2D is a locally enlarged view including a camera decoration part area in FIG. 2C.

Still refer to FIG. 2C and FIG. 2D. FIG. 2C shows an overall rendering after a camera decoration part provided in this application is mounted, in cooperation with a camera assembly in FIG. 2A, on a housing of an electronic device. FIG. 2D is a locally enlarged view including a camera decoration part area in FIG. 2C. It can be learned from an appearance of the camera decoration part that, the camera decoration parts in FIG. 2C and FIG. 2D can present complete decoration renderings (not shown in the figures). For the decoration rendering of the camera decoration part, refer to FIG. 2F and FIG. 2G.

Figure 2E:
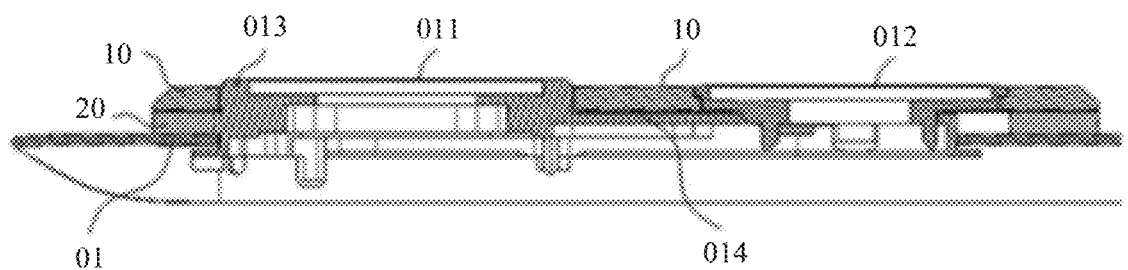
FIG. 2E is a schematic diagram of an M-direction structure of FIG. 2D.

As shown in FIG. 2C to FIG. 2E, FIG. 2E is a schematic diagram of an M-direction structure in FIG. 2D. After the camera decoration part is connected to the housing of the electronic device, the first camera 011 and the second camera 012 in the camera assembly can be exposed, and the protrusion 014 that is higher than the housing 01 can be covered in the camera decoration part, so that the complete decoration rendering on the camera decoration part can be retained.

The following describes a structure of the camera decoration part with reference to accompanying drawings in detail.

Figure 2F:
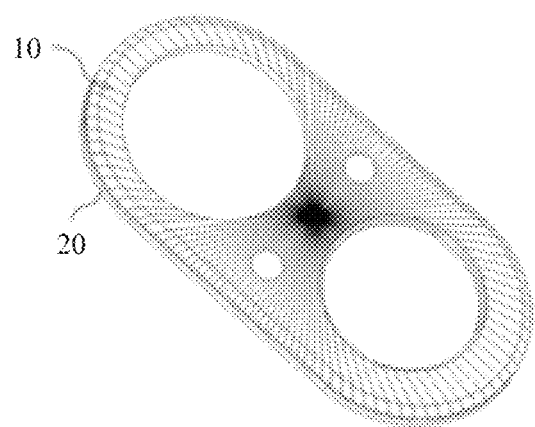
FIG. 2F is a schematic diagram of an overall structure of a camera decoration part according to an embodiment of this application.
Figure 2G:
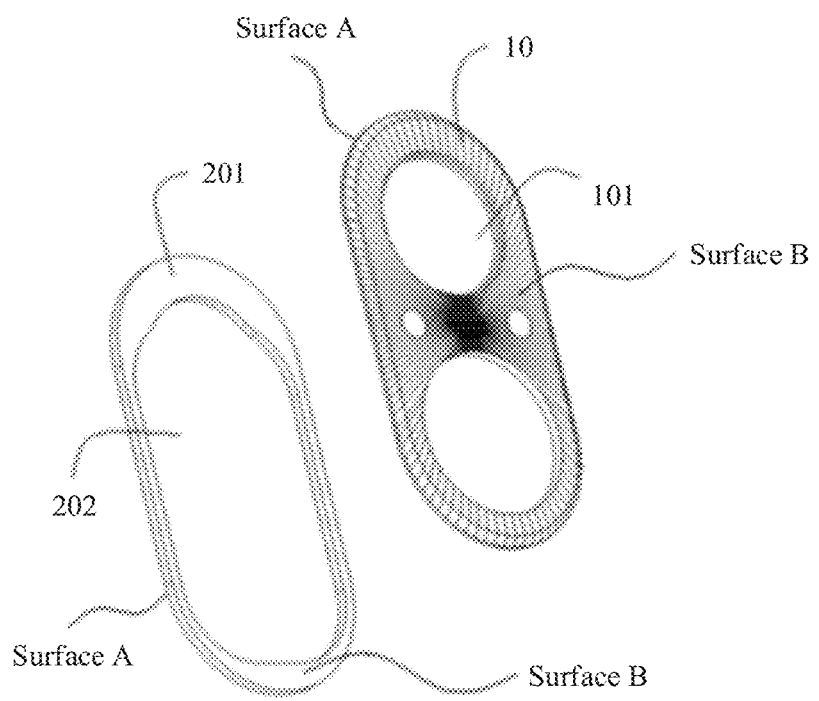
FIG. 2G is an exploded view of a camera decoration part according to an embodiment of this application.

As shown in FIG. 2F and FIG. 2G, FIG. 2F is a schematic diagram of an overall structure of a camera decoration part according to an embodiment of this application, and FIG. 2G is an exploded view of FIG. 2F. The camera decoration part in this embodiment of this application includes two plates: a first plate 10 and a second plate 20. First through-holes 101 used to penetrate through the main cameras are disposed on the first plate 10, a surface A (a first surface) of the first plate 10 is a flat surface, and the decoration rendering is fabricated on the surface A of the first plate 10.

As shown in FIG. 2G, the second plate 20 is of an annular structure with a hollow-out area in the middle, where the middle hollow-out area is used to avoid the main cameras 011 and 012 and the protrusion 014 in the camera assembly.

With reference to FIG. 2E and FIG. 2G, the second plate 20 is located between the first plate 10 and the housing 01, the surface A of the first plate 10 is connected to a surface B (a second surface) of the second plate 20, and a surface A of the second plate 20 is connected to an outer surface of the housing 01 of the electronic device. The middle hollow-out area of the second plate 20 avoids the main cameras 011 and 012 and the protrusion 014 in the camera assembly. A thickness of the second plate 20 is the same as a height of the protrusion 014. After the second plate 20 is connected to the outer surface of the housing 01, a height difference between the first plate and the outer surface of the housing 01 is compensated. The second plate 20 and the protrusion 014 that have the same thickness provide a flat mounting surface for the first plate 10, so that it is no longer necessary to perform avoidance cutting for the surface A of the first plate 10, and completeness of the decoration rendering of the surface A of the first plate 10 is ensured.

It should be noted that the foregoing is merely described by using a scenario in which the main cameras are disposed on a rear housing of the electronic device as an example. In actual application, the camera decoration part may be further applied to a scenario in which the main cameras are disposed on another housing of the electronic device. This is not limited in this application.

The following further describes a structure of the first plate 10 of the camera decoration part in this application with reference to the accompanying drawings.

In each embodiment of this application, a shape and the structure of the first plate 10 may be determined based on a requirement, for example, may be determined based on a contour shape that is formed by the protrusion 014 and the main cameras. The shape of the first plate 10 may be a regular shape or an irregular shape. For example, the first plate 10 may be a rectangle or a rectangle with rounded corners.

Figure 3A:
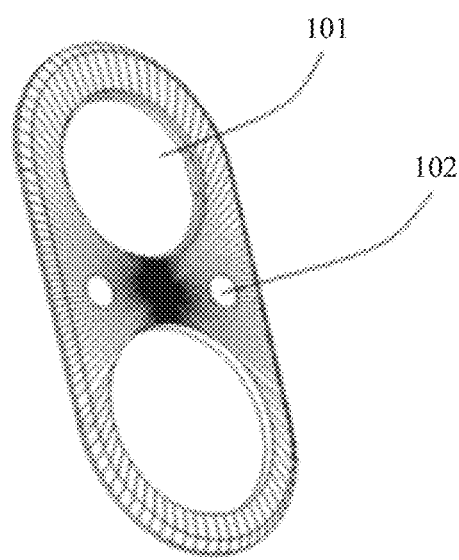
FIG. 3A is a schematic diagram of a structure of a first plate of a camera decoration part according to an embodiment of this application.

As shown in FIG. 3A, two first through-holes 101 that are respectively used to penetrate through the first camera 011 and the second camera 012 are disposed on the first plate 10, where positions and sizes of the two first through-holes 101 respectively correspond to those of the first camera 011 and the second camera 012 on the electronic device.

The first plate 10 includes the surface A (the first surface) and a surface B (second surface) that are opposite to each other. The surface A of the first plate 10 is connected to the surface B of the second plate 20. The surface A of the first plate 10 has the decoration rendering, and the decoration rendering may be set based on an actual requirement, for example, may be a texture effect, a glare effect, or may have both the texture effect and the glare effect.

A forming manner of the decoration rendering on the surface A of the first plate 10 is not limited in this application. For example, the decoration rendering may be a pattern etched on the surface A of the first plate 10 through etching. For another example, the decoration rendering may be a pattern or a glare effect printed on the surface A of the first plate 10 through a printing process. For still another example, the decoration rendering may alternatively be obtained by transferring a pattern or a glare effect printed on a film to the surface A of the first plate 10.

Figure 3B:
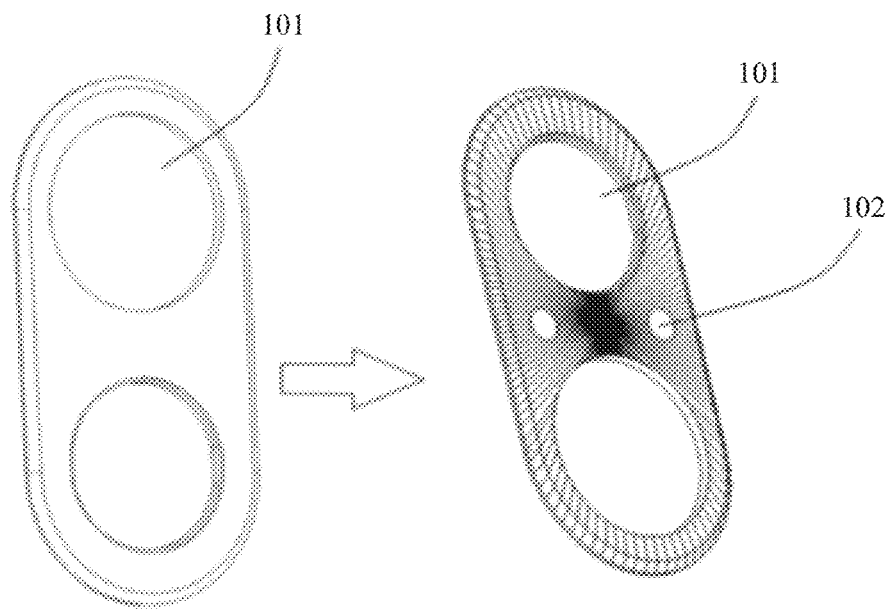
FIG. 3B is a flowchart of fabricating a decoration rendering on a first plate according to an embodiment of this application.
Figure 3C:
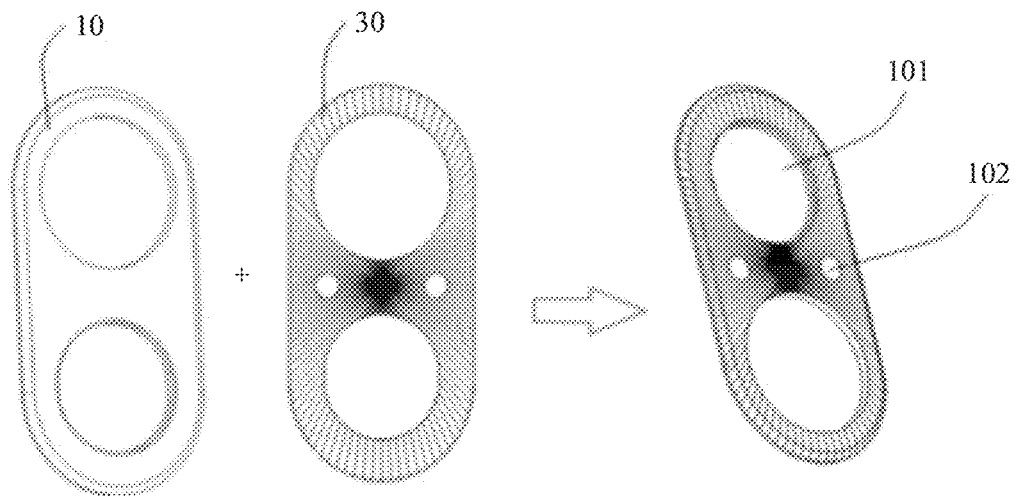
FIG. 3C is another flowchart of fabricating a decoration rendering on a first plate according to an embodiment of this application.

In an implementation, as shown in FIG. 3B, the decoration rendering may be directly fabricated on the surface A of the first plate 10. For example, first, a desired texture may be fabricated on the surface A of the first plate 10 through a UV transfer printing process; then a film is coated on the surface A of the first plate 10, to obtain a desired glare effect; and finally, ink may also be coated on the surface A of the first plate 10, where the ink can the texture and strengthen adhesive performance between the first plate 10 and the second plate 20. To avoid a problem that an inner wall of the first through-hole of the first plate 10 is easily contaminated during the process of directly fabricating the decoration rendering on the surface A of the first plate 10, in another implementation, as shown in FIG. 3C, first, the decoration rendering may be fabricated on a film 30, and then the film 30 with the decoration rendering is pasted on the surface A of the first plate 10. For example, first, a desired decoration rendering is obtained by fabricating the texture, coating the film, and coating the ink on the film 30, and then the film 30 with the decoration rendering is bonded to the surface A of the first plate 10. A shape of the film 30 should be the same as the shape of the first plate 10. For example, first through-holes whose quantity and sizes are the same as those of the first plate 10 are disposed on the film 30. A material of the film 30 is usually a thin plastic film. For example, the film 30 may be made of a plastic glare film.

To be able to see the decoration rendering on the surface A of the first plate 10 through the surface B of the first plate 10, a material of the first plate 10 in this application is a transparent material, for example, the material of the first plate 10 may be transparent glass, crystal, acrylic, or the like.

At least one window area 102 may be further fabricated on the surface A of the first plate 10, and the window area 102 may be used as a lens of a small camera in the camera assembly. A method for fabricating the window area 102 is not limited in this application. For example, an AR film is coated on the surface A of the first plate 10 or in a selected area of the film 30, to obtain the window area 102 with high transparency.

It should be noted that the foregoing first plate 10 is an example used for convenience of solution description, and does not represent a limitation on the structure of the first plate 10 in this application. As shown in FIG. 3A, the surface B of the first plate 10 may be a flat surface, or may not be a flat surface, for example, a structure with a concave-convex structure. This is not limited in this application. The surface B of the first plate 10 is directly exposed to the outside of the electronic device. Therefore, some surface treatments may be performed on the surface B of the first plate 10 to improve surface performance of the surface B of the first plate 10. For example, the surface performance is strengthened by coating an AF film and by using flow coating and hardening processes, so that the surface B of the first plate 10 is waterproof and moisture-proof, friction-resistant, and easy to clean.

It should be further noted that, in the foregoing implementations, a case in which the camera assembly includes two main cameras is only used as an example for description. However, it does not indicate that the structure of the first plate 10 can be only applied to a scenario in which the two main cameras are included, and the structure of the first plate 10 can be further applied to a scenario in which more or fewer main cameras are included. If the first plate 10 is applied to the scenario more or fewer main cameras are included, the positions, quantities, and the sizes of the first through-holes 101 on the first plate 10 need to be correspondingly adjusted. Details are not described one by one herein again. For related parts, refer to the foregoing implementations.

The following further describes a structure of the second plate 20 in this application with reference to the accompanying drawings.

The second plate 20 is configured to hold the first plate 10 and the housing 01 of the electronic device. A peripheral contour of the second plate 20 may be the same as a peripheral contour of the first plate 10. Therefore, after the first plate 10 is bonded to the second plate 20, the camera decoration part with a regular periphery may be obtained. It should be understood that the peripheral contour of the second plate 20 may alternatively be different from the peripheral contour of the first plate 10. For example, the peripheral contour of the second plate 20 is slightly smaller than the peripheral contour of the first plate 10, so that a projection of the peripheral contour of the second plate 20 is in a projection of the peripheral contour of the first plate 10.

Figure 4A:
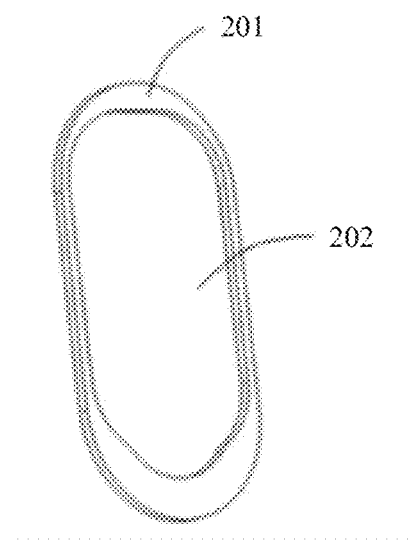
FIG. 4A is a schematic diagram of a structure of a second plate of a camera decoration part according to an embodiment of this application.

With reference to FIG. 4A and FIG. 2E, the thickness of the second plate 20 is equal to the height of the protrusion 014; the second plate 20 includes the middle hollow-out area 202 and a connection area 201; the hollow-out area 202 penetrates through the second plate 20 in a thickness direction of the second plate 20; a projection of the protrusion 014 and projections of the main cameras are all in a projection area of the hollow-out area 202; and the hollow-out area 202 is surrounded by the connection area 201. As shown in FIG. 2E, after a surface A (a first surface) of the second plate 20 is connected to the housing 01, the connection area 201 corresponding to a surface B (a second surface) of the second plate 20 and an upper surface of the protrusion 014 are on a same horizontal plane. In this way, the surface A of the first plate 10 may be indirectly connected to the housing 01 through the connection area 201 of the second plate, so that cutting of an area that is of the surface A of the first plate 10 and that corresponds to the protrusion 014 is avoided, and the completeness of the decoration rendering of the first surface of the first plate 10 is ensured.

The area that is of the surface A of the first plate 10 and that corresponds to the protrusion 014 may be connected to the upper surface of the protrusion 014, and an area that is of the surface A of the first plate 10 and that corresponds to the connection area 201 may be connected to the connection area 201.

It should be noted that the first plate 10 is mainly used for decoration, and the second plate 20 is mainly used to hold the first plate 10 and the housing 01. Therefore, a material of the second plate 20 is not limited in this application, and the second plate 20 may be made of a material that is the same as or different from that of the first plate 10. If the second plate 20 is made of a material that is the same as that of the first plate 10, it is more conducive to implementing bonding and connection between the first plate 10 and the second plate 20.

It should be further noted that the foregoing embodiment is merely described by using a protrusion structure shown in FIG. 2A. In actual application, the protrusion structure is not only limited to that shown in FIG. 2A. A position and a size of the hollow-out area 202 may be adjusted based on different protrusion structures.

The following further describes a connection manner between the first plate 10 and the second plate 20 in this application with reference to the accompanying drawings.

In this application, the first plate 10 may be directly connected to the second plate 20, or may be connected to the second plate 20 by using another component or material. This is not limited in this application.

Figure 5A:
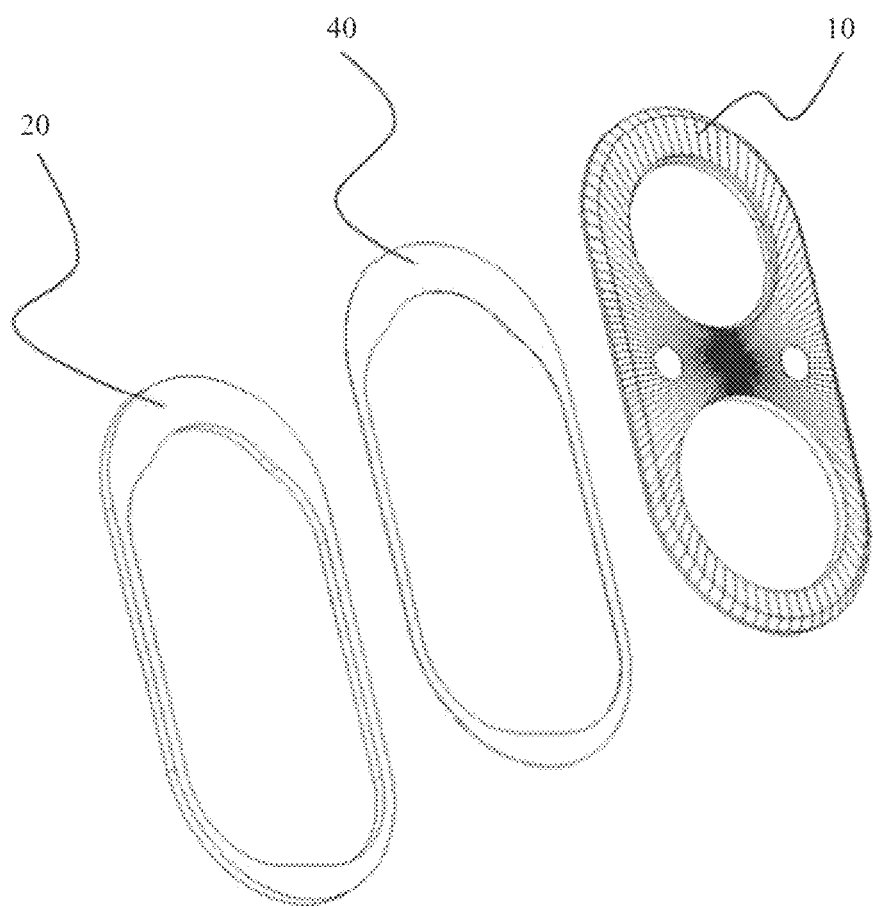
FIG. 5A is an exploded view of a camera decoration part obtained by connecting a first plate and a second plate by using a hot melt adhesive tape according to an embodiment of this application.
Figure 5B:
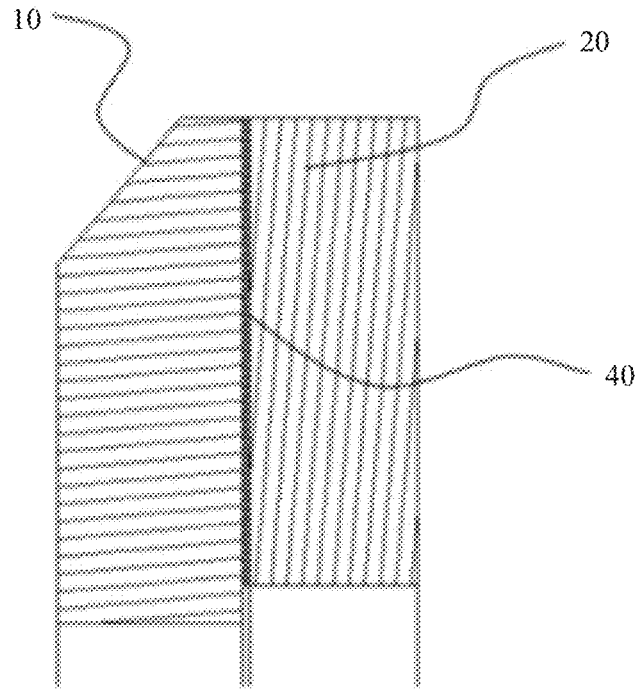
FIG. 5B is a side sectional view of a camera decoration part obtained by connecting a first plate and a second plate by using a hot melt adhesive tape according to an embodiment of this application.

In an implementation, as shown in FIG. 5A and FIG. 5B, the first plate 10 is pasted and connected to the second plate 20 by using a hot melt adhesive tape 40. The hot melt adhesive tape 40 is not adhesive at a normal temperature. The hot melt adhesive tape 40 is adhesive only after heat treatment is performed, so that the first plate 10 and the second plate 20 may be pasted together.

Figure 5C:
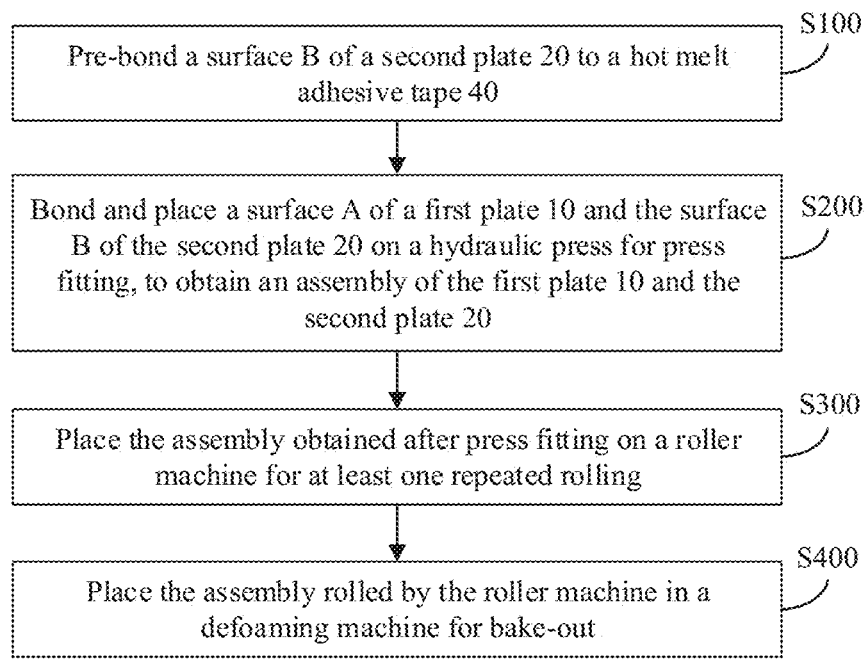
FIG. 5C is a schematic diagram of work flows of a method for fabricating a camera decoration part according to an embodiment of this application.

To improve adhesive strength between the first plate 10 and the second plate 20, and ensure that a connection surface between the first plate 10 and the second plate 20 is flat and flawless, this application further provides a construction method in which the first plate 10 is pasted on the second plate 20 by using the hot melt adhesive tape 40. As shown in FIG. 5C, the method includes the following steps:

Step 100: Pre-bond the surface B of the second plate 20 to the hot melt adhesive tape 40 under a silicone roller with a first temperature;

The hot melt adhesive tape 40 may be cut into a shape that is the same as that of the surface B of the second plate, and then the surface B of the second plate 20 is fittingly pre-bonded to the hot melt adhesive tape 40 under the silicone roller with the first temperature, to ensure that air bubbles between the hot melt adhesive tape 40 and the surface B of the second plate 20 are uniform.

The first temperature may be adjusted appropriately based on different materials of the selected hot melt adhesive tape 40. Usually, the first temperature may be 120-140° C., for example, the first temperature is 130° C.

Step 200: Bond and place the surface A of the first plate 10 and the surface B of the second plate 20 on a hydraulic press for press fitting, to obtain an assembly of the first plate 10 and the second plate 20, where a press fitting temperature of the hydraulic press may be set to 110-130° C., and a press fitting time may be 5-20 s.

In a specific example, the press fitting temperature of the hydraulic press may be set to 120° C., and the press fitting time may be 10 s.

Step 300: Place the assembly obtained after pressing fitting on a roller machine for at least one repeated rolling, where a rolling speed of the roller machine may be set to 2-10 m/min, and a temperature to which the assembly can be heated by the roller machine may be set to 80-100° C.

In a specific example, the speed of the roller machine is 5 m/min, and the temperature to which the assembly can be heated by the roller machine is 90° C.

After the step 200 and the step 300, the hot melt adhesive tape may be activated, and the air bubbles between the first plate and the second plate may be removed.

Step 400: Place the assembly rolled by the roller machine in a defoaming machine for bake-out.

In this application, the assembly is placed in the defoaming machine for the bake-out, so that the hot melt adhesive tape 40 can be fully activated. The defoaming machine may be a high-pressure defoaming machine, for example, the high-pressure defoaming machine that can reach about 1.0 Mpa. The bake-out temperature in the high-pressure defoaming machine may be set to 80-100° C., and a bake-out time may be set to 20-40 minutes. In a specific example, the bake-out temperature in the high-pressure defoaming machine is 90° C. and the bake-out time is 30 minutes.

After the first plate 10 is pasted on the second plate 20 by using the foregoing method, high-gloss cutting may be further performed on circumference of the assembly of the first plate 10 and the second plate 20, to obtain the camera decoration part shown in FIG. 2E. An appearance of the camera decoration part shown in FIG. 2E has no residual glue and other defects, so that the entire camera decoration part has good transparency.

Figure 5D:
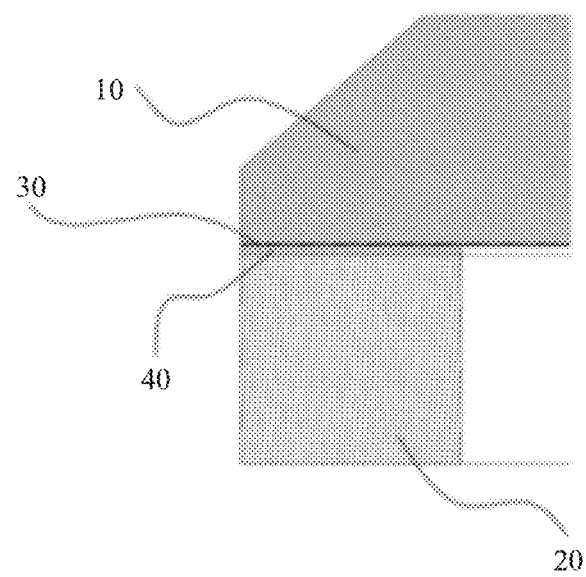
FIG. 5D is a side sectional view of another camera decoration part obtained by connecting a first plate and a second plate by using a hot melt adhesive tape according to an embodiment of this application.

If the decoration rendering is transferred to the surface A of the first plate 10 by using the film 30, the first plate 10 pasted with the film 30 may be pasted and connected to the second plate 20 by using the hot melt adhesive tape based on the foregoing method, to obtain the pasted camera decoration part. As shown in FIG. 5D, the hot melt adhesive tape 40 is located between the film 30 and the second plate 20.

Figure 6A:
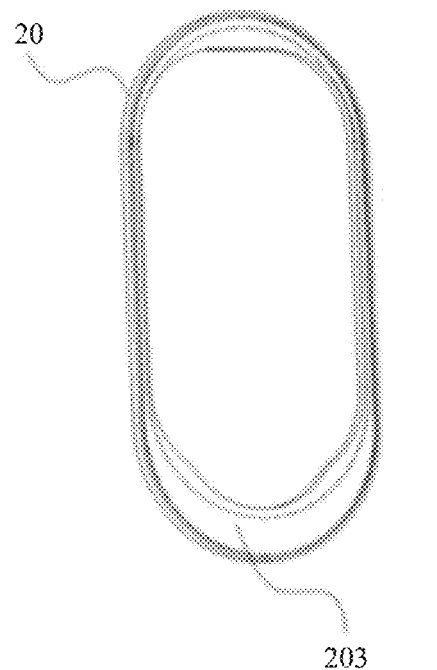
FIG. 6A is a schematic diagram of a structure of a second plate of another camera decoration part according to an embodiment of this application.
Figure 6B:
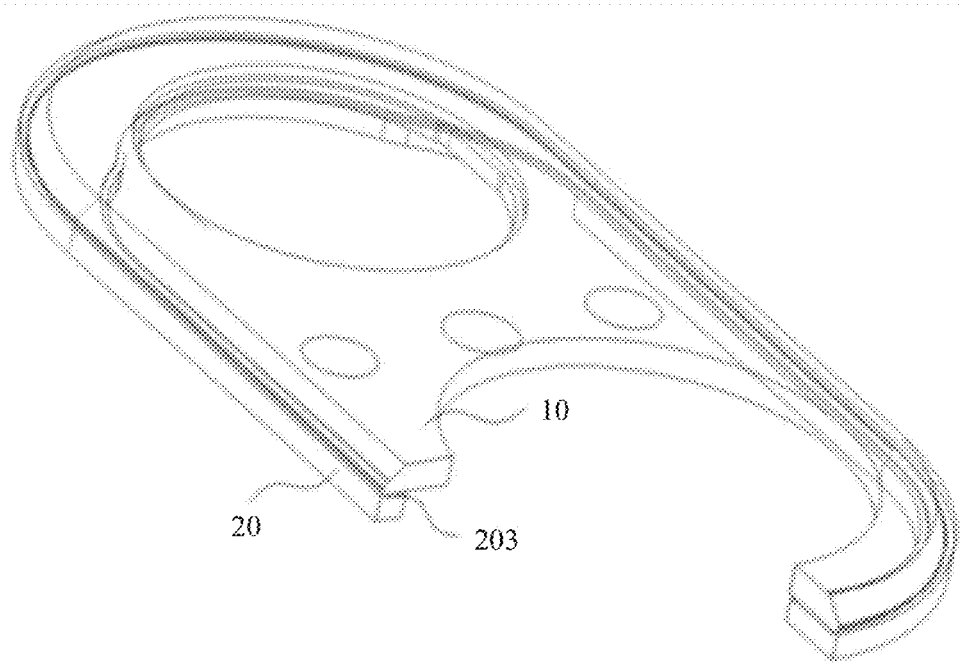
FIG. 6B is a schematic diagram of a structure of another camera decoration part according to an embodiment of this application.

In another implementation, the first plate 10 may be pasted and connected to the second plate 20 by using glue. If the first plate 10 is connected to the second plate 20 by using the glue, as shown in FIG. 6A, a glue dispensing groove 203 may be disposed on the surface B of the second plate 20. After a glue dispenser is used to dispense the glue in the glue dispensing groove, the surface A of the first plate 10 and the surface B of the second plate 20 are bonded and pressed. For example, the surface A of the first plate 10 and the surface B of the second plate 20 may be placed in a fixture for one hour, to ensure a high adhesive strength between the first plate 10 and the second plate 20, so as to obtain the camera decoration part shown in FIG. 6B.

Figure 6C:
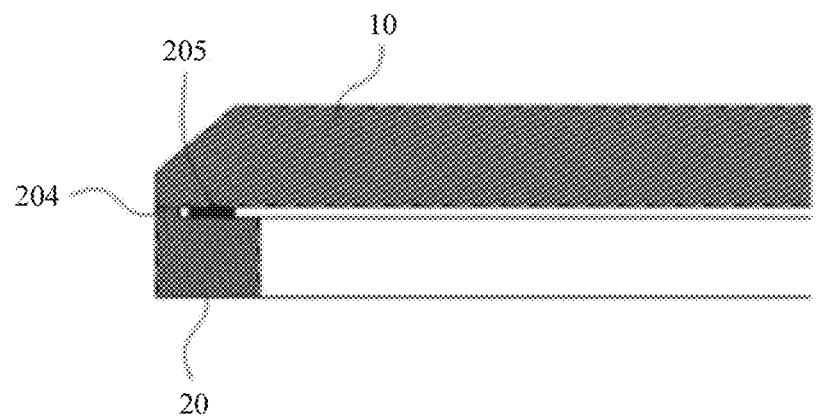
FIG. 6C is a side sectional view of FIG. 6B.

The applicant has found that, in the manner of connecting the first plate 10 and the second plate 20 by using glue, a thickness of the glue is usually greater than 0.1 mm. Therefore, the glue is visible on an external surface of the assembly that is obtained after the first plate 10 is pasted on the second plate 20, which cannot meet an appearance requirement. Therefore, as shown in FIG. 6C, in this application, a retaining wall 204 is further disposed around a periphery of the glue dispensing groove 203, and the retaining wall 204 is used to block the glue 205 in the glue dispensing groove 203. A height of the retaining wall 204 is greater than the thickness of the glue 205. For example, the thickness of the glue 205 is 0.2 mm, and the height of the retaining wall 204 is 0.3 mm. After the glue 205 is solidified, the glue 205 is located between the first plate 10 and the second plate 20, and the retaining wall 204 acts as a concealer, so that the camera decoration part has no residual glue and other defects in appearance, and the entire camera decoration part has good transparency.

It should be noted that, in actual application, the first plate 10 and the second plate 20 may be assembled first and then connected to the housing 01; or the second plate 20 may be connected to the housing 01 first, and then the first plate 10 is connected to the second plate 20. The connection manner between the second plate 20 and the housing 01 is not limited in this application. For example, the second plate 20 may be pasted and connected to the housing 01 by using an adhesive tape.

The camera decoration part in the foregoing embodiment includes the first plate 10 and the second plate 20 that cooperate with each other. The first plate 10 is mainly used to decorate the camera, and after the second plate 20 cooperates with the housing through the disposed hollow-out area 202, the second plate 20 provides the flat mounting surface for the first plate 10, thereby ensuring the completeness of the decoration rendering on the first surface of the first plate 10.

Figure 4B:
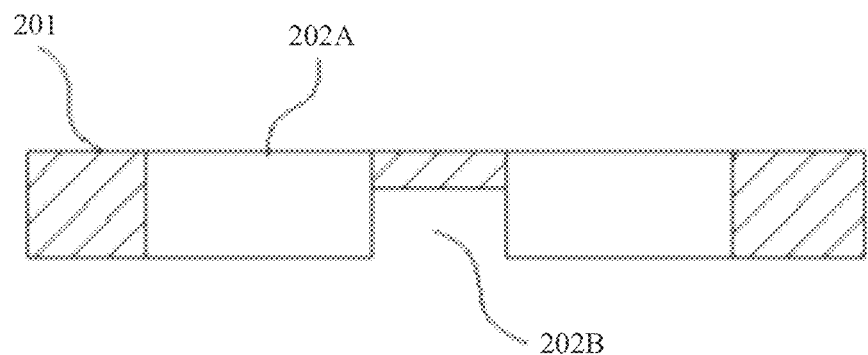
FIG. 4B is a schematic diagram of a structure of a second plate of another camera decoration part according to an embodiment of this application.

In the foregoing embodiments, the hollow-out area 202 is integrally formed in a middle area of the second plate 20, to avoid the main cameras and the protrusion 014. In actual application, the structure of the second plate 20 provided in the foregoing embodiment is not limited in this application, provided that the second plate 20 can avoid the main cameras and the protrusion 014. For example, the second plate 20 may only include a second through-hole 202 A corresponding to the first through-hole 101, and an avoidance area 202 B corresponding to the protrusion 014. As shown in FIG. 4B, in another implementation, the thickness of the second plate 20 may be greater than the height of the protrusion 014. In this case, the avoidance area 202 B may not penetrate through the second plate 20 in the thickness direction of the second plate 20. As shown in FIG. 4B, the avoidance area 202 B is formed by etching from the surface A of the second plate 20 to the surface B of the second plate 20 by a first depth, where the etched first depth is greater than or equal to the height of the protrusion 014 on the housing 01 of the electronic device, and is less than the thickness of the second plate 20. To be specific, a groove structure is formed by etching from the surface A of the second plate 20 to the surface B of the second plate 20 by the first depth, where a bottom area of the groove can cover an area at which the upper surface of the protrusion 014 is located. In this way, the surface B of the second plate 20 may present a same shape as the surface A of the first plate 10, so that a connection area between the first plate 10 and the second plate 20 can be increased. In this implementation, after the second plate 20 is connected to the housing 01, the protrusion 014 is located in the groove on the second plate, so that the surface B of the second plate 20 may be used as the mounting surface of the first plate 10.

It should be noted that, in the second plate shown in FIG. 4A, the second through-hole 202 A communicates with the avoidance area 202 B to form a complete hollow-out area 202, and the entire hollow-out area 202 penetrates through the second plate 20 in the thickness direction of the second plate 20; while in the second plate shown in FIG. 4B, only the second through-hole 202 A penetrates through the second plate in the thickness direction of the second plate.

Embodiment 2

The following describes a structure of another camera decoration part in this application with reference to accompanying drawings. The camera decoration part includes a first plate 10, a second plate 20, and a third plate 50.

The following still uses a scenario in which an electronic device includes two main cameras as an example to describe a structure of a camera decoration part including the third plate 50.

Figure 7A:
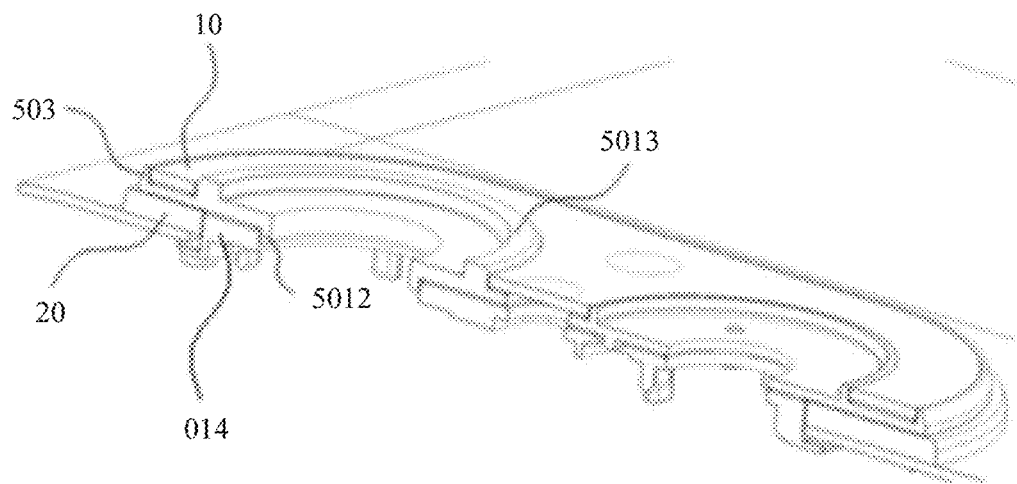
FIG. 7A is a rendering after another camera decoration part is mounted on a housing of an electronic device according to an embodiment of this application.
Figure 7B:
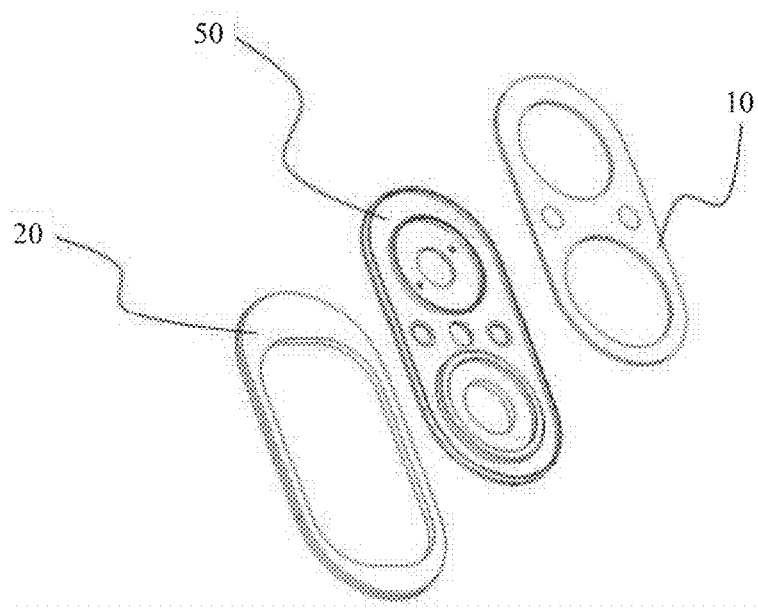
FIG. 7B is an exploded view of another camera decoration part according to an embodiment of this application.

As shown in FIG. 7A and FIG. 7B, FIG. 7A is a rendering after the camera decoration part in Embodiment 2 in this application is mounted on a housing of an electronic device, and FIG. 7B is an exploded view of the camera decoration part in Embodiment 2 of this application. The third plate 50 is located between the first plate 10 and the second plate 20.

In this way, a surface A of the first plate 10 is connected to an upper surface of the third plate 50, a surface B of the second plate 20 is connected to a lower surface of the third plate 50, and a surface A of the second plate 20 is connected to an outer surface of the housing. The third plate 50 added between the first plate 10 and the second plate 20 may reduce a thickness of the first plate 10, so that the first plate 10 has better transparency.

For structures of the first plate 10 and the second plate 20, refer to the description in the foregoing Embodiment 1. Details are not described herein again.

The following further describes a structure of the third plate 50 in this application with reference to the accompanying drawings.

Figure 7C:
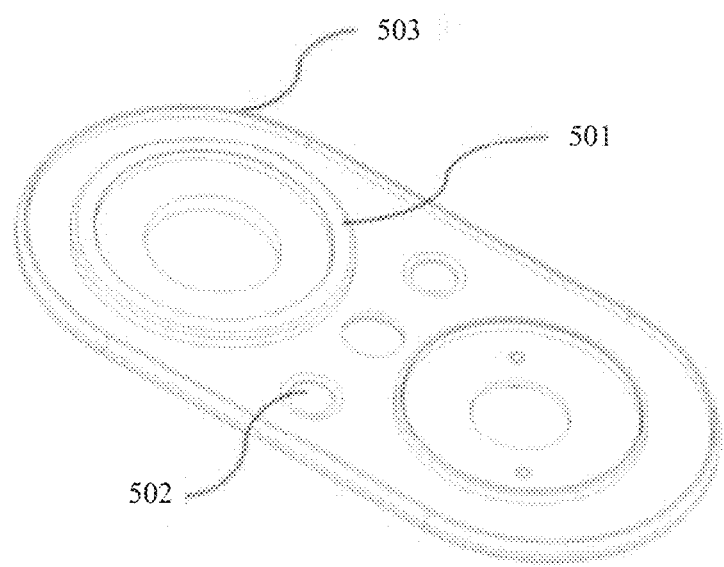
FIG. 7C is a schematic diagram of a structure of a third plate of another camera decoration part according to an embodiment of this application.
Figure 7D:
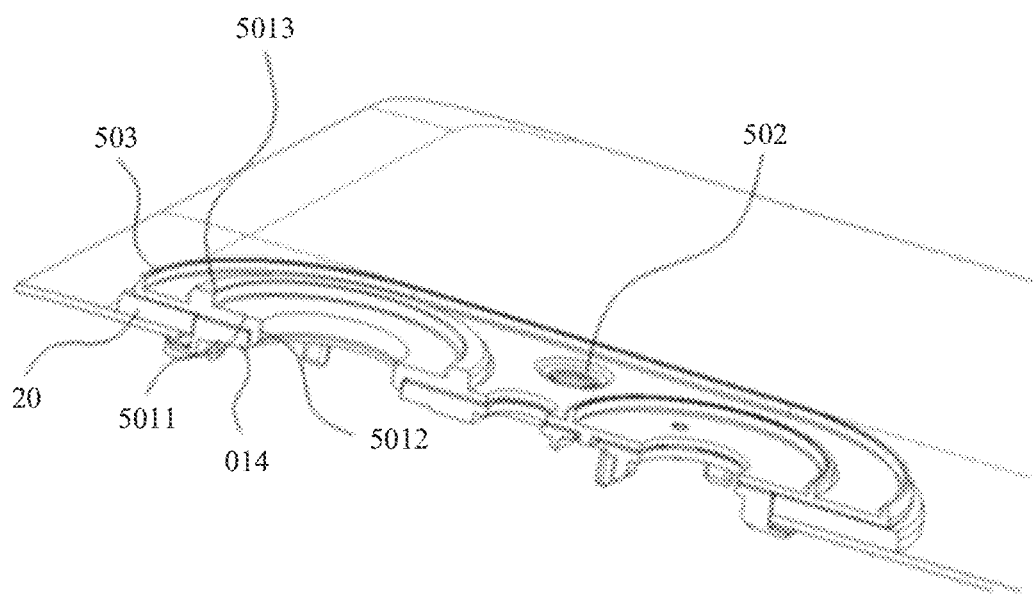
FIG. 7D is a schematic diagram after a first plate is removed from FIG. 7A.

As shown in FIG. 7B and FIG. 7C, a peripheral contour of the third plate 50 may be the same as a peripheral contour of the first plate 10 and a peripheral contour of the second plate 20. Further, as shown in FIG. 7D, a periphery of the third plate 50 may further extend in a direction that is close to the first plate 10, to form a first limiting baffle plate 503. The first limiting baffle plate 503 may limit the first plate 10 to an area enclosed by the first limiting plate 503 on the third plate 50.

As shown in FIG. 7C and FIG. 7D, the third plate 50 includes two decoration rings 501, and the decoration rings 501 correspond to positions of first through-holes 101 on the first plate 10. The decoration rings 501 have a same function as the metal rings 013 in Embodiment 1, and each decoration ring 501 is configured to be sleeved around a corresponding main camera to protect the main camera. The protrusion 014 located below the decoration ring 501 is configured to support and fasten the decoration ring 501 to the housing of the electronic device. A light hole 502 corresponding to a non-main camera of a camera assembly is further disposed on the third plate 50, and the light hole 502 corresponds to a window area 102 on the first plate 10.

It should be understood that the peripheral contour of the third plate 50 may alternatively be different from the peripheral contour of the first plate 10 and the peripheral contour of the second plate 20. For example, the peripheral contour of the third plate 50 is slightly smaller than the peripheral contour of the first plate 10, so that a projection of the peripheral contour of the third plate 50 is in a projection of the peripheral contour of the first plate 10. A material of the third plate 50 is not limited in this application, and a material of the third plate 50 may be metal, transparent glass, crystal, acrylic, or the like As shown in FIG. 7D, the decoration ring 501 includes a decoration ring body 5011, a second limiting baffle plate 5012, and a third limiting baffle plate 5013. The decoration ring body 5011 is of annular plate structure, and is mainly lapped around the first camera. The decoration ring body 5011 may be configured to fasten a lens corresponding to the first camera. The second limiting baffle plate 5012 extends along an inner hole wall of the decoration ring body 5011 in a direction that is close to the second plate 20. In this way, after the decoration ring is placed behind the first camera, the second limiting baffle plate 5012 can just fit into a camera hole of the first camera, thereby limiting the decoration ring around the first camera, and preventing the decoration ring from moving. The third limiting baffle plate 5013 is disposed around the decoration ring, and the third baffle plate 5013 is located on a second surface of the third plate 50. The third baffle plate 5013 is configured to limit a lens corresponding to the main camera. In other words, the lens of the main camera may be mounted in an area enclosed by the third baffle plate 5013. A groove is enclosed by the third limiting baffle plate 5013 and the first limiting baffle plate 5011, and the first plate 10 may be placed in the groove, so that the first plate 10 may be limited to the third plate by using the third limiting baffle plate 5013 and the first limiting baffle plate 5011. It should be noted that, if the electronic device includes two main cameras, one decoration ring 501 may be sleeved around each main camera. If the camera decoration part includes two or more decoration rings 501, each decoration ring 501 may be disposed separately to form an independent component; in this case, the third plate 50 includes two independent decoration rings 501. Alternatively, all the decoration rings 501 may be connected to each other, to form an integral component. This case is shown by the structure of the third plate 50 shown in FIG. 7D.

It should be further noted that, as shown in FIG. 7D, if the camera decoration part includes two or more decoration rings 501, a surface that is of each decoration ring 501 and that is used to connect to the first plate should be on a same horizontal plane, and a surface that is of each decoration ring 501 and that is used to connect to the second plate should also be on a same horizontal plane.

It should be further noted that, in the foregoing implementations, only the decoration ring around the first camera in FIG. 7D is used as an example for description, which do not represent a limitation on the decoration ring 501 in this application. Positions and sizes of the second limiting baffle plate 5012 and the third limiting baffle plate 5013 in the decoration ring 501 may be adjusted based on different actual usage scenarios. For example, as shown in FIG. 7D, in the decoration ring 501 around the second camera, the second limiting baffle plate 5012 may be disposed in a selected position between an inner ring and an outer ring of the decoration ring body 5011.

The connection manner between the first plate 10, the second plate 20 and the third plate 50 is not limited in this application. The first plate 10 may be directly connected to the third plate 50, or may be connected to the third plate 50 by using another component or material; and the second plate 20 may be directly connected to the third plate 50, or may be connected to the third plate 50 by using another component or material. In an implementation, the first plate 10 may be pasted and connected to the third plate 50 by using an adhesive tape, and the second plate 20 may be pasted and connected to the third plate 50 by using a hot melt adhesive tape.

It should be noted that the foregoing embodiments are only used to describe differences between different camera decoration parts; and for similarities between different camera decoration parts (for example, a structure of a first plate and a structure of a second plate), reference may be made to other embodiments. Details are not described one by one herein again.

By using the technical solutions provided in the foregoing embodiments, the third plate 50 is added between the first plate 10 and the second plate 20, so that the thickness of the first plate 10 can be reduced, and the first plate 10 has higher transparency A user can more clearly see a decoration rendering on the first surface of the first plate 10 from an appearance, and if a window area is disposed on the first plate 10, transparency of the camera corresponding to the window area can be improved.

What is claimed is:

1. A camera decoration part configured to be applied to an electronic device, wherein the electronic device comprises a camera assembly, wherein the camera assembly comprises a main camera protruding from an outer surface of a housing of the electronic device by a first height, wherein the camera assembly comprises a protrusion that is located around the main camera and that is connected to an outer surface of the housing of the electronic device, and wherein the camera decoration part comprises:
- a first plate comprising a first surface having a decoration rendering, wherein a material of the first plate is a transparent material, wherein a first through-hole used to penetrate through the main camera is disposed on the first plate; and
- a second plate, comprising:
  - a first surface connected to the outer surface of the housing of the electronic device; and
  - a second surface connected to the first surface of the first plate,
- wherein a second through-hole corresponding to the first through-hole is disposed on the second plate,
- wherein the first surface of the second plate comprises a connection area and an avoidance area,
- wherein the avoidance area is formed by recessing the first surface of the second plate to the second surface of the second plate by a first depth,
- wherein a thickness of the second plate is greater than or equal to a height of the protrusion on the housing of the electronic device,
- wherein the first depth is greater than or equal to the height of the protrusion, and
- wherein a projection of the protrusion is in a projection area of the avoidance area.

2. The camera decoration part of claim 1, wherein the first depth is equal to the thickness of the second plate, wherein the second through-hole and the avoidance area are connected to form a hollow-out area, and wherein the connection area surrounds the hollow-out area.

3. The camera decoration part of claim 1, wherein a third plate is disposed between the first plate and the second plate, and wherein a decoration ring corresponding to the first through-hole is disposed on the third plate.

4. The camera decoration part of claim 3, further comprising a first limiting baffle plate that extends along a periphery of the third plate in a direction that is close to the first plate, wherein the first plate is surrounded in an area that is enclosed by the first limiting baffle plate.

5. The camera decoration part of claim 4, further comprising:
- a second limiting baffle plate that extends along an inner hole wall of the decoration ring in a direction that is close to the second plate, wherein the second limiting baffle plate is configured to limit the decoration ring around the main camera;
- a third limiting baffle plate that is disposed around the decoration ring, wherein the third limiting baffle plate is located on a second surface of the third plate, and wherein the third limiting baffle plate is configured to limit a lens corresponding to the main camera; and
- a groove that is enclosed by the third limiting baffle plate and the first limiting baffle plate, wherein the first plate is located in the groove.

6. The camera decoration part of claim 1, wherein the decoration rendering is printed on the first surface of the first plate through a printing process.

7. The camera decoration part of claim 1, wherein the decoration rendering is formed by pasting a film with the decoration rendering on the first surface of the first plate.

8. The camera decoration part of claim 1, wherein the first surface of the first plate comprises at least one window area.

9. The camera decoration part of claim 1, wherein the second surface of the second plate is pasted and connected to the first surface of the first plate with a hot melt adhesive tape.

10. The camera decoration part of claim 9, wherein the second surface of the second plate is pasted and connected to the first surface of the first plate by:
- pre-bonding the second surface of the second plate to the hot melt adhesive tape under a silicone roller with a first temperature;
- bonding and placing the first surface of the first plate and the second surface of the second plate on a hydraulic press for press fitting, to obtain an assembly of the first plate and the second plate;
- placing the assembly obtained after press fitting on a roller machine for repeated rolling; and
- placing the assembly rolled by the roller machine in a defoaming machine for bake-out, to obtain the camera decoration part.

11. The camera decoration part of claim 10, wherein the first temperature is 120-140° C.

12. The camera decoration part of claim 10, wherein a press fitting temperature of the hydraulic press is 110-130° C., and wherein a press fitting time is 5-20 seconds.

13. The camera decoration part of claim 10, wherein a rolling speed of the roller machine is 2-10 meters/minute, and wherein a rolling temperature of the roller machine is 80-100° C.

14. The camera decoration part of claim 10, wherein a bake-out temperature in the defoaming machine is 80-100° C., and wherein a bake-out time is 20-40 minutes.

15. The camera decoration part of claim 1, wherein a glue dispensing groove is disposed on the second surface of the second plate, wherein a retaining wall is disposed around a periphery of the glue dispensing groove, wherein the second surface of the second plate is pasted and connected to the first surface of the first plate by using glue, and wherein the glue is filled in the glue dispensing groove.

16. The camera decoration part of claim 3, wherein the first plate is pasted and connected to the third plate with an adhesive tape, and wherein the second plate is pasted and connected to the third plate with a hot melt adhesive tape.

17. An electronic device, comprising:
- a camera assembly, comprising:
  - a main camera protruding from a first height of an outer surface of a housing of the electronic device; and
  - a protrusion that is located around the main camera and that is connected to the outer surface of the housing of the electronic device; and
- a camera decoration part, comprising:
  - a first plate comprising a first surface having a decoration rendering, wherein a material of the first plate is a transparent material, wherein a first through-hole used to penetrate through the main camera is disposed on the first plate; and
  - a second plate, comprising:
    - a first surface connected to the outer surface of the housing of the electronic device; and
    - a second surface connected to the first surface of the first plate,
- wherein a second through-hole corresponding to the first through-hole is disposed on the second plate,
- wherein the first surface of the second plate comprises a connection area and an avoidance area,
- wherein the avoidance area is formed by recessing the first surface of the second plate to the second surface of the second plate by a first depth, wherein a thickness of the second plate is greater than or equal to a height of the protrusion on the housing of the electronic device, wherein the first depth is greater than or equal to the height of the protrusion, and wherein a projection of the protrusion is in a projection area of the avoidance area.

\* \* \* \* \*